(12) United States Patent
Campbell et al.

(10) Patent No.: US 8,339,082 B2
(45) Date of Patent: Dec. 25, 2012

(54) METHODS AND SYSTEMS FOR INDUCTION MOTOR CONTROL

(75) Inventors: Mengwei Campbell, Torrance, CA (US); Bon Ho Bae, Torrance, CA (US); Milun Perisic, Torrance, CA (US); Yo Chan Son, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 326 days.

(21) Appl. No.: 12/784,873

(22) Filed: May 21, 2010

(65) Prior Publication Data

US 2011/0285342 A1 Nov. 24, 2011

(51) Int. Cl.
*H02P 7/00* (2006.01)
(52) U.S. Cl. .................................. 318/432; 318/727
(58) Field of Classification Search .................. 318/727, 318/798, 799, 801, 805, 432, 434
See application file for complete search history.

(56) References Cited

U.S. PATENT DOCUMENTS

| | | | |
|---|---|---|---|
| 4,958,116 A * | 9/1990 | Hirose | 318/800 |
| 5,043,649 A | 8/1991 | Murakami et al. | |
| 5,144,216 A * | 9/1992 | De Doncker | 318/807 |
| 5,334,923 A * | 8/1994 | Lorenz et al. | 318/805 |
| 6,433,506 B1 * | 8/2002 | Pavlov et al. | 318/804 |
| 6,683,428 B2 * | 1/2004 | Pavlov et al. | 318/432 |
| 6,854,881 B2 | 2/2005 | Nada | |
| 6,870,348 B2 | 3/2005 | Mijalkovic et al. | |
| 7,560,895 B2 * | 7/2009 | Arnet | 318/778 |
| 7,570,074 B2 | 8/2009 | Gao et al. | |
| 7,615,951 B2 | 11/2009 | Son et al. | |
| 7,746,013 B2 | 6/2010 | Fernengel et al. | |
| 8,013,565 B2 | 9/2011 | Miura | |
| 8,069,827 B2 | 12/2011 | Watanabe et al. | |
| 2009/0189561 A1 | 7/2009 | Patel | |

OTHER PUBLICATIONS

Mellor, P.H., et al. "Lumped parameter thermal model for electrical machines of TEFC design," IEEE Proceedings on Electric Power Applications, Sep. 1991, pp. 205-218, vol. 138, No. 5.
Asaii, B., et al. "A new thermal model for EV induction machine drives," IEEE Power Electronics in Transportation, Oct. 1996, pp. 175-182.
Gao, Z., et al. "A sensorless adaptive stator winding temperature estimator for mains-fed induction machines with continuous-operation periodic duty cycles," IEEE Transactions on Industry Applications, Sep./Oct. 2008, pp. 1533-1542, vol. 44, No. 5.
Briz, F., et al. "Temperature estimation in inverter-fed machines using high-frequency carrier signal injection," IEEE Transactions on Industry Applications, May/Jun. 2008, pp. 799-808, vol. 44, No. 3.

(Continued)

*Primary Examiner* — Rina Duda
(74) *Attorney, Agent, or Firm* — Ingrassia Fisher & Lorenz, P.C.

(57) ABSTRACT

A method is provided for controlling an induction motor having a rotor. The method includes receiving a torque command; comparing the torque command to a threshold torque value; generating, with a first estimation module, a first estimated rotor resistance when the torque command is less than or equal to the threshold torque value; generating, with a second estimation module, a second estimated rotor resistance when the torque command is greater than the threshold torque value; and generating control signals for the induction motor based on the first estimated rotor resistance or the second estimated rotor resistance.

20 Claims, 4 Drawing Sheets

OTHER PUBLICATIONS

Al-Tayie, J.K., et al. "Estimation of speed, stator temperature and rotor temperature in cage induction motor drive using the extended kalman filter algorithm," IEEE Proceedings in Electric Power Applications, Sep. 1997, pp. 301-309, vol. 144, No. 5.

Colby, R.S., et al. "A model reduction perspective on thermal models for induction machine overload relays," IEEE Transactions on Industrial Electronics, Oct. 2008, pp. 3525-3534, vol. 55, No. 10.

Yeh, C-C., et al. "Electric Motor Stator Winding Temperature Estimation," U.S. Appl. No. 12/568,002, filed Sep. 28, 2009.

Campbell, M., et al. "Methods and Systems for Induction Machine Control," U.S. Appl. No. 12/635,313, filed Dec. 10, 2009.

Yeh, C-C., et al. "Electric Motor Stator Winding Temperature Estimation Systems and Methods," U.S. Appl. No. 12/778,733, filed May 12, 2010.

United States Patent and Trademark Office, U.S. Office Action dated Mar. 28, 2012 for U.S. Appl. No. 12/568,002.

U.S. Office Action, dated Aug. 9, 2012, for U.S. Appl. No. 12/635,313.

U.S. Office Action, dated Aug. 16, 2012, for U.S. Appl. No. 12/568,002.

U.S. Ex Parte Quayle Action, dated Sep. 20, 2012, for U.S. Appl. No. 12/778,733.

* cited by examiner

US 8,339,082 B2

METHODS AND SYSTEMS FOR INDUCTION MOTOR CONTROL

TECHNICAL FIELD

The present invention generally relates to the field of induction machines, and, more specifically, to methods and systems for controlling induction motors.

BACKGROUND

Indirect field-oriented control (IFOC) is widely used for induction machines, including induction motors of vehicles. For example, IFOC is utilized in some vehicles for three-phase induction motor control of traction applications. IFOC can be a valuable tool. For example, if certain parameters are known, IFOC reduces the complex dynamics of the induction motor to the dynamics of a separately excited direct current motor. This approach allows the flux and torque of the induction motor to be controlled independently.

However, if the parameters used in IFOC are not identical to the actual parameters in the induction machine, the desired machine flux level may not be properly maintained. In addition, because the desired torque is estimated based on the actual parameters, torque linearity may also be lost. For example, it may be difficult to properly maintain decoupling between the flux and torque if less than ideal rotor resistance values are used in the calculation. Thus, rotor resistance values, which are functions of rotor temperature, can have a significant impact on the performance of IFOC. Torque accuracy, response and efficiency can similarly be affected by the accuracy of the values of rotor resistance that are used in the calculations.

Accordingly, it is desirable to provide improved methods and systems for controlling an induction motor that provide improved estimates of rotor resistance. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for controlling an induction motor having a rotor. The method includes receiving a torque command; comparing the torque command to a threshold torque value; generating, with a first estimation module, a first estimated rotor resistance when the torque command is less than or equal to the threshold torque value; generating, with a second estimation module, a second estimated rotor resistance when the torque command is greater than the threshold torque value; and generating control signals for the induction motor based on the first estimated rotor resistance or the second estimated rotor resistance.

In accordance with another exemplary embodiment, a system is provided for controlling an induction motor having a rotor. The system includes a transition module configured to receive a rotor speed of the rotor and a torque command; a first estimation module coupled to the transition module and configured to generate a first resistance estimation; a second estimation module coupled to the transition module and configured to generate a second resistance estimation; and a controller module coupled to the first estimation module and the second estimation module and configured to generate control signals for the induction motor based on the first resistance estimation or the second resistance estimation as a function of the torque command.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments disclosed herein provide improved induction motor control. In particular, the exemplary systems and methods provide an improved estimation of rotor temperature, which in turn, provides an improved estimation of rotor resistance. The rotor temperatures may be generated, for example, by thermal models using estimated rotor current and the temperature of the coolant or stator to provide more accurate estimations, particularly at low torque conditions. The estimated rotor resistance is then used as an input into an IFOC module to provide improved operation of the induction motor.

Figure 1:
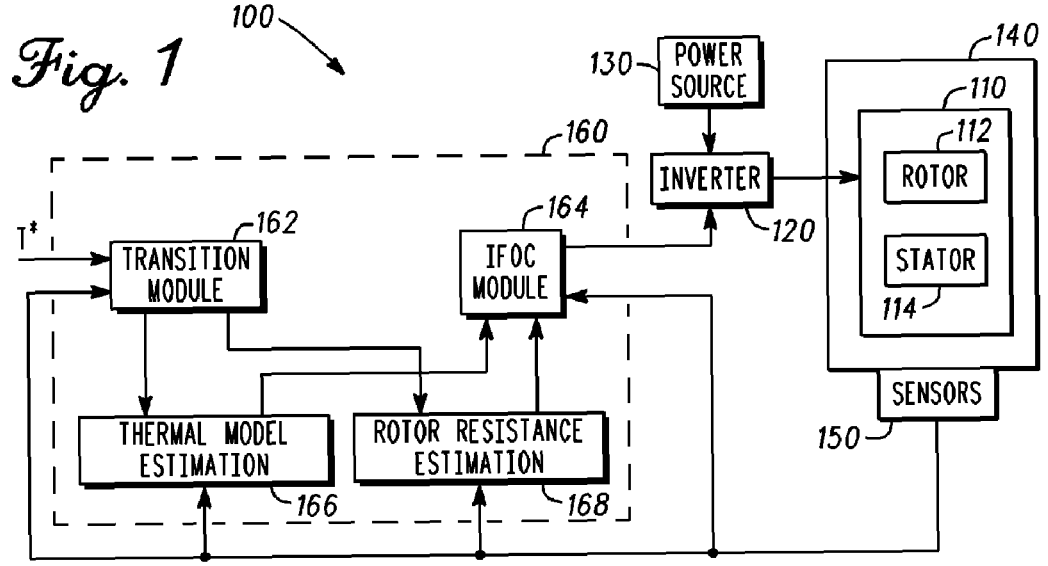
FIG. 1 is a functional block diagram of an induction motor system in accordance with an exemplary embodiment.

FIG. 1 is a functional block diagram of an induction motor system 100 in accordance with an exemplary embodiment. In one exemplary embodiment, the system 100 is implemented in a hybrid electric vehicle (HEV) and includes an induction motor 110, an inverter assembly 120, a power source 130, a cooling system 140, one or more sensors 150, and a controller 160. As described in greater detail below, during operation, the system 100 receives a torque command (T*) based on, for example, inputs from a driver. The controller 160 receives the torque command (T*) and produces reference voltages ($V_a$, $V_b$, $V_c$) that control the inverter assembly 120 to drive the induction motor 110. The induction motor 110 produces a torque on a drive shaft (not shown) of the HEV. A more detailed description of the system 100 will now be provided.

The induction motor 110 may be a multi-phase alternating current (AC) that generally includes a rotor 112 and a stator 114 with windings or coils that may be grouped to correspond to operating phases. The inverter assembly 120 drives the operation of the induction motor 110 and generally includes one or more inverters, each including switches with antiparallel diodes. In various embodiments, the switches are implemented with insulated gate bipolar transistors (IGBTs), metal oxide semiconductor field effect transistors (MOSFETs), and/or the like. The windings of the stator 114 are electrically coupled between the switches of the inverter assembly 120 to receive current and generate torque in the induction motor 110. In one exemplary embodiment, the inverter assembly 120 provides alternating phase currents ($i_a$, $i_b$, $i_c$) to drive three-phases of the induction motor 110 at varying speeds based on the input voltage ($V_{DC}$) of the power source 130 and control signals from the controller 160.

A cooling system 140 with a coolant, such as motor oil, surrounds and cools the induction motor 110 during operation. The sensors 150 may include any suitable type of sensor for collecting information within the system 100 for the controller 160. For example, the sensors 150 may determine or otherwise derive coolant temperatures ($T_{COOLANT}$), rotor positions ($\theta_r$), rotor speeds ($\omega_r$), and other parameters used as inputs for the modules of the controller 160.

As noted above, the controller 160 provides control signals to the inverter assembly 120 based on torque commands (T*). In one exemplary embodiment, the controller 160 includes a transition module 162, an indirect field-oriented control (IFOC) module 164, a thermal model estimation module 166 for estimating rotor temperature, and a rotor resistance estimation module 168 for estimating rotor temperature. The structure and function of the controller 160 will be described in greater detail with further reference to FIGS. 2-5.

Figure 2:
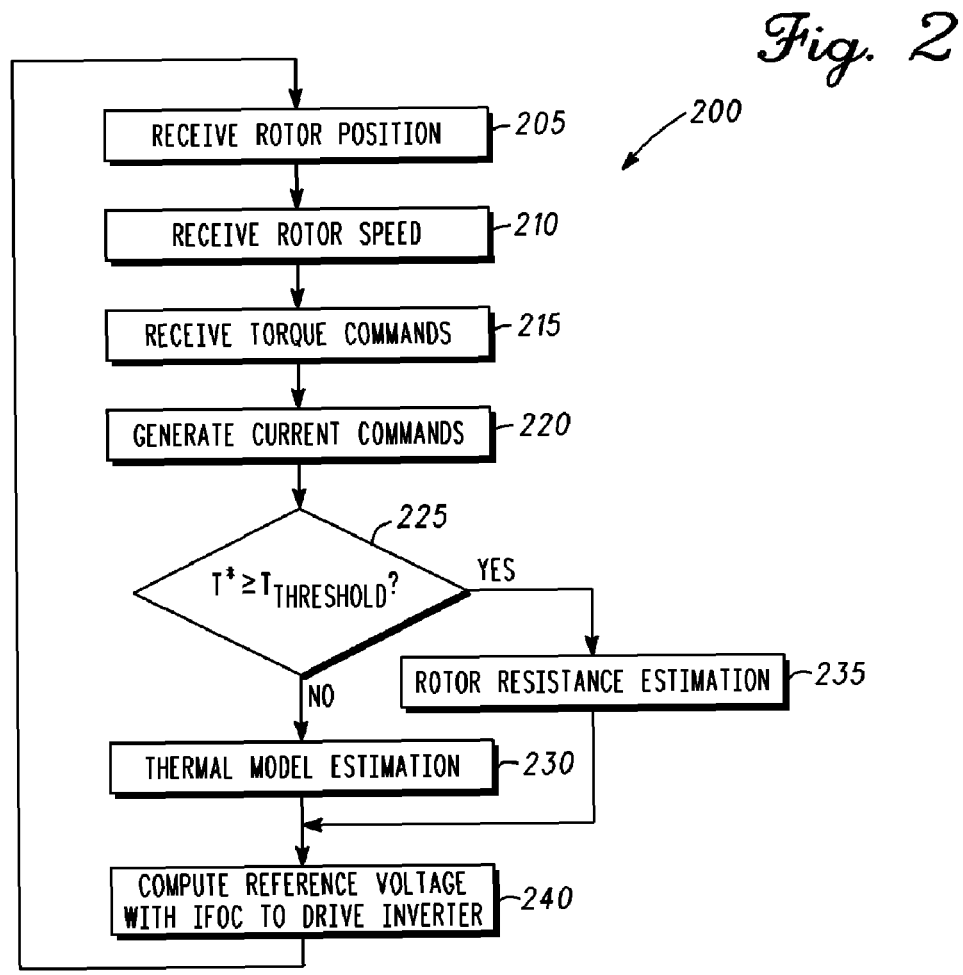
FIG. 2 is a flow chart of a method for operating a controller of the induction motor system of FIG. 1 in accordance with an exemplary embodiment.

FIG. 2 is a flow chart of a method 200 for operating the controller 160 of the system 100 of FIG. 1 in accordance with an exemplary embodiment. In the description below, reference is additionally made to FIG. 1. In step 205, the controller 160 receives the position ($\theta_r$) of the rotor 112, and in step 210, the controller 160 receives the speed ($\omega_r$) of the rotor 112. The rotor position ($\theta_r$) and rotor speed ($\omega_r$) may be provided, for example, by the sensors 150.

In step 215, the controller 160 receives the torque command (T*) from, for example, the driver. Particularly, the torque command (T*) may be received by the transition module 162 of the controller 160. In response, the transition module 162 may generate stator current commands ($i^*_{ds}$, $i^*_{qs}$) corresponding to the torque command (T*), as indicated in step 220.

In step 225, the transition module 162 further evaluates the torque condition. If the torque command (T*) is less than or equal to a threshold torque value, the controller 160 uses the thermal model estimation module 166, as indicated in step 230. However, if the torque command (T*) is greater than the threshold torque value the controller 160 uses the rotor resistance estimation module 168, as indicated in step 235. In one exemplary embodiment, the threshold torque value used in step 225 may be, for example, 5 Nm although any suitable threshold values may be used. In another embodiment, the threshold toque value is 3 Nm. The thermal model estimation module of step 230 and the rotor resistance estimation of step 235 are discussed in greater below. After the estimations of step 230 or step 235, the IFOC module 164 calculates the reference voltages ($V_a$, $V_b$, $V_c$) in step 240 necessary to drive the inverter assembly 120 and generate torque at the induction motor 110. The method 200 then loops back to step 205.

Figure 3:
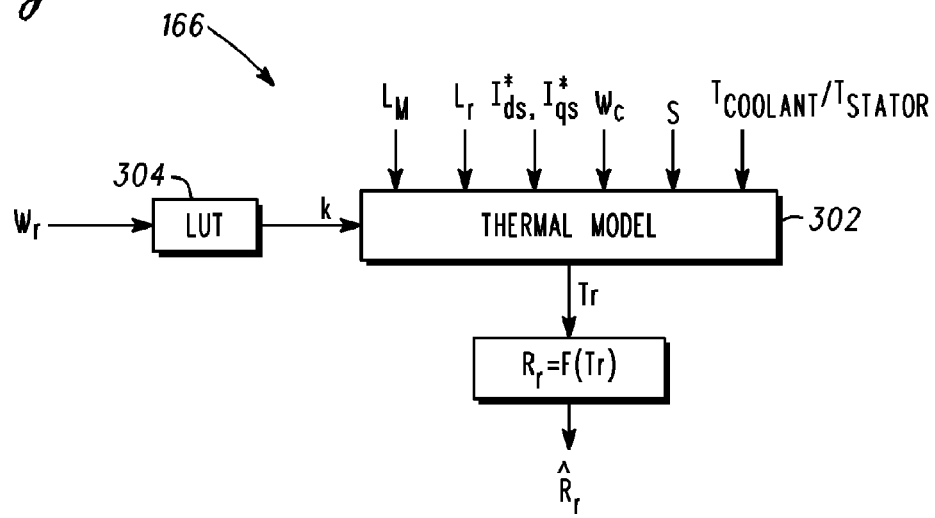
FIG. 3 is a functional block diagram illustrating of the operation of a thermal model estimation module for estimating rotor temperature in the controller of FIG. 1 in accordance with an exemplary embodiment.

FIG. 3 is a functional block diagram illustrating of the operation of the rotor temperature estimation using the thermal model estimation module 166 of the controller 160 of FIG. 1 in accordance with an exemplary embodiment and generally corresponds to step 230 of the method 200 discussed above in FIG. 2. As noted above, the thermal model estimation module 166 is used in operating conditions with low torque values, e.g., at torque values less than 5 Nm The thermal model estimation module 166 includes a thermal model block 302 that receives or derives a number of input values for the rotor temperature estimation. The input values include the commanded value for stator current components ($i^*_{ds}$, $i^*_{qs}$), mutual inductance ($L_m$), rotor inductance ($L_r$), cutoff frequency of the low pass filter ($\omega_c$), Laplace domain operator (s), and coolant temperature ($T_{COOLANT}$).

The thermal model is based on the relationship of Equation (1), as follows:

$$T_r = T_{coolant} + P_r R_{th}\left(\frac{\omega_c}{s + \omega_c}\right) \quad (1)$$

where $T_r$ is the estimated temperature of the rotor; $T_{COOLANT}$ is the temperature of the coolant; $R_{th}$ is the thermal resistance between the rotor and the coolant; $P_r$ power dissipation in the rotor; $\omega_c$ is cutoff frequency of the low pass filter, and s is the Laplace domain operator.

The relationship of Equation (1) may be simplified as Equation (2), as follows:

$$T_r = T_{coolant} + I_r^2 K\left(\frac{\omega_c}{s + \omega_c}\right) \quad (2)$$

where $I_r$ is the estimated rotor current, and K is a speed dependent correction factor.

Additionally, the rotor current ($I_r$) may be estimated as Equation (3), as follows:

$$I_r = \frac{L_m}{L_r} I_{qs} \quad (3)$$

where $I_{qs}$ is the stator current in the q-reference frame; $L_m$ is the mutual inductance, and $L_r$ is the rotor inductance.

The estimated rotor resistance ($R_r$) is a function of the estimated rotor temperature ($T_r$), as expressed in following Equation (4):

$$\hat{R}_r = f(T_r) \quad (4)$$

Accordingly, based on the relationships in Equations (1)-(3), the thermal model block 302 estimates the rotor temperature ($T_r$) and then estimates the rotor resistance ($R_r$) based on the rotor temperature ($T_r$). The correction factor (K) may be derived from a look-up table 304 stored in the thermal model estimation module 166 based on the rotor speed ($\omega_r$). Interpolation (e.g., linear interpolation or other known interpolation techniques) may be used to further refine the resulting correction factor (K) between speed values. In some exemplary embodiments, the temperature of the stator ($T_{STATOR}$) may be used in addition to or in place of the coolant temperature ($T_{COOLANT}$). In these instances, the correction factor (K) of Equation (2) and a cutoff frequency of a low pass filter may be modified relative to those values associated with the coolant temperature ($T_{COOLANT}$).

The output of the thermal model block 302 is provided to block 306, which incorporates equation (4), to provide a final estimated value for rotor resistance ($R_r$) for use in the IFOC module 164 of FIG. 1. Although not specifically illustrated, the thermal model estimation module 166 may include one or more of a low pass filter, integrator, or other algorithm processors. For example, the initial value of a low pass filter of the thermal model is the last rotor temperature estimated from the rotor resistance estimation module minus the present coolant temperature (Tr_est−Tcoolant). The thermal model estimation module 166 provides a more accurate rotor temperature/resistance estimation as compared to conventional controllers at low torque, particularly those that base the rotor resistance estimation on the temperature of the stator.

Figure 4:
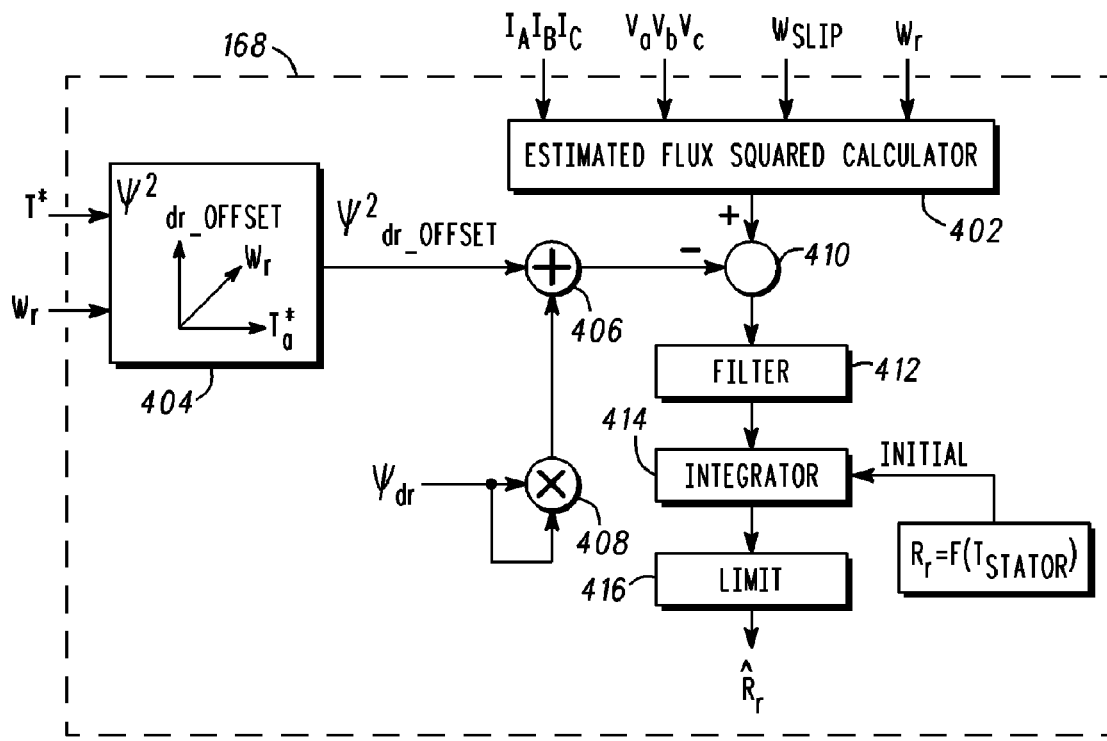
FIG. 4 is a functional block diagram illustrating of the operation of a rotor resistance estimation module for estimating rotor temperature in the controller of FIG. 1 in accordance with an exemplary embodiment.

FIG. 4 is a functional block diagram illustrating of the operation of the rotor resistance estimation module 168 of the controller 160 of FIG. 1 in accordance with an exemplary embodiment. As noted above, the rotor resistance estimation module 168 is used in operating conditions with high torque values, e.g., at torque values greater than 5 Nm.

The rotor resistance estimation module 402 estimates a rotor flux magnitude ($\hat{\psi}_r^2$) using internal variables such as voltages ($V_a$, $V_b$, $V_c$), rotor slip angle ($\omega_{slip}$), phase currents ($i_a$, $i_b$, $i_c$), and rotor speed ($\omega_r$). In one exemplary embodiment, these variables are provided or derived from the sensors 150 or other components of the induction motor system 100. Additionally, the voltages ($V_a$, $V_b$, $V_c$), and the phase currents ($i_a$, $i_b$, $i_c$) may be the command voltages and currents rather than measured or derived currents to eliminate noise content. Moreover, the voltages ($V_a$, $V_b$, $V_c$), and the phase currents ($i_a$, $i_b$, $i_c$) may be received or converted as dq-reference frame values (i.e., as $V_{qs}$, $V_{ds}$, and $I_{qs}$, $I_{ds}$).

Specifically, in this exemplary embodiment, the estimated motor flux square $\hat{\psi}_r^2$ is obtained by the following Equation (5):

$$\hat{\psi}_r^2 = \left\{(V_q i_d - V_d i_q) - L_s \sigma \left(i_d \frac{d}{dt} i_q - i_q \frac{d}{dt} i_d + \omega_e i_d^2 + \omega_e i_q^2\right)\right\} \frac{L_r}{\omega_e} \quad (5)$$

where $V_d$ and $V_q$ are stator commanded voltages in a synchronous reference frame, $i_d$ and $i_q$ are stator currents in a synchronous frame (e.g., in which commanded currents are preferably used), $L_s \sigma$ is an equivalent leakage inductance, $L_r$ is rotor inductance, and $\omega_e$ is stator electrical frequency.

In one exemplary embodiment, this estimated rotor flux squared tracks the actual flux squared. This flux may be calculated as follows in Equation (6):

$$\frac{L_r}{R_r} \frac{d\psi_{dr}}{dt} = -\psi_{dr} + L_m i_d \quad (6)$$

In one exemplary embodiment, if the rotor resistance ($R_r$) is the actual rotor resistance and estimated fluxes from Equations (5) and (6) accurate reflect the motor flux, then the estimated rotor flux squared ($\hat{\psi}_r^2$) value in Equation (5) should be equal to the actual rotor flux squared ($\psi_{dr}^2$) value in Equation (6). However, mutual inductance ($L_m$) may change significantly with the machine saturation level. Accordingly, the estimated rotor flux squared ($\hat{\psi}_r^2$) value in Equation (5) is parameter sensitive. In addition, leakage inductance variation with machine operation may also affect the accuracy of the value for estimated rotor flux squared ($\hat{\psi}_r^2$). Accordingly, even though the correct rotor resistance ($R_r$) is used, there is still an offset between estimated rotor flux squared ($\hat{\psi}_r^2$) and the actual rotor flux squared ($\psi_{dr}^2$) value. This offset may cause an error in rotor resistance ($R_r$) estimation, and therefore should be considered, as discussed below.

A rotor flux square offset value ($|\psi_r|^2$) is determined for look up table 404 using the rotor speed ($\omega_r$) and the torque command (T*). The flux square offset may account for any expected differences between the estimated rotor flux squared ($\hat{\psi}_r^2$) and the actual rotor flux squared ($\psi_{dr}^2$) in light of the actual rotor resistance ($R_r$).

Additionally, in block 408, a value of actual rotor flux ($\psi_{dr}$) is obtained from Equation (6) and multiplied by itself. The resulting squared value ($\psi^2_{dr}$) is then added to the flux square offset value $|\psi_r|^2$ from the look up table 404 in block 406, to thereby generate a summed offset value. Next, in block 410, a difference is calculated between the summed value from block 406 and the estimated flux square value ($\psi_{dr}^2$) from block 402.

The output of block 410 is then processed via a filter 412 (e.g., a low-pass filter), an integrator 414 initialized with a first initial rotor resistance value as a function of the stator temperature, then the previous estimated rotor resistance value is used as an initial value of the integrator 414, and a limit function or algorithm 416 incorporating known temperature limits for the induction motor 110 in order to provide a final estimated value for rotor resistance ($R_r$) for use in the IFOC module 164 of FIG. 1. Because the estimated rotor flux squared ($|\psi_r|^2$) value is sensitive to the rotor resistance $R_r$, any difference between the actual rotor resistance ($R_r$) value and the estimated rotor resistance ($R_r$) value may produce a non-zero error. The non-zero error results in the rotor resistance ($R_r$) value used in the IFOC module 164 to change.

Figure 5:
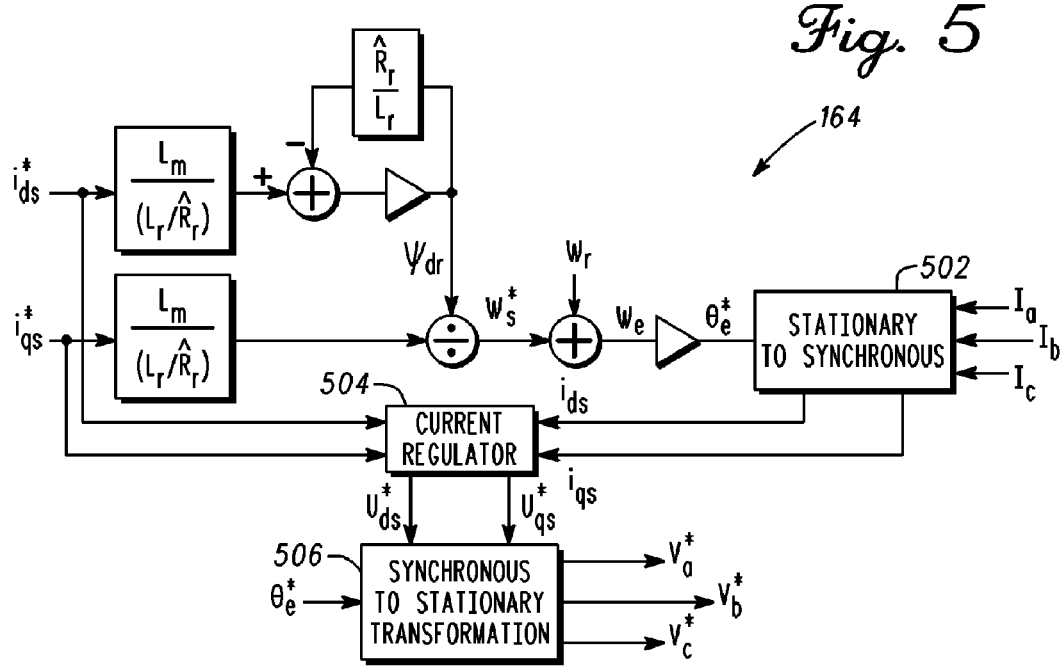
FIG. 5 is a functional block diagram illustrating of the operation of an IFOC module of the controller of FIG. 1 in accordance with an exemplary embodiment.

FIG. 5 is a functional block diagram illustrating of the operation of the IFOC module 164 of the controller 160 of FIG. 1 in accordance with an exemplary embodiment. The IFOC module 164 utilizes the commanded value for stator current components ($i^*_{ds}$, $i^*_{qs}$), the estimated rotor resistance ($R_r$), mutual inductance ($L_m$), and rotor speed ($\omega_r$) to calculate a slip angle ($\omega^*_s$) and a flux angle ($\theta^*_e$). A stationary to synchronous converter 502 transforms the flux angle ($\theta^*_e$), along with current component values ($i_a$, $i_b$, $i_c$) from a stationary reference frame to a synchronous reference frame in order to generate updated stator current components ($i_{ds}$, $i_{qs}$). The commanded value for stator current components ($i^*_{ds}$, $i^*_{qs}$), and updated stator current components ($i_{ds}$, $i_{qs}$). are provided to the current regulator 504 to generate updated voltage commands and transformed from the synchronous reference frame back to the stationary reference frame in a synchronous to stationary converter 506 to generate the output reference voltages ($V_a$, $V_b$, $V_c$), which are subsequently supplied to the inverter assembly 120 for use in controlling the induction motor 110.

Figure 6:
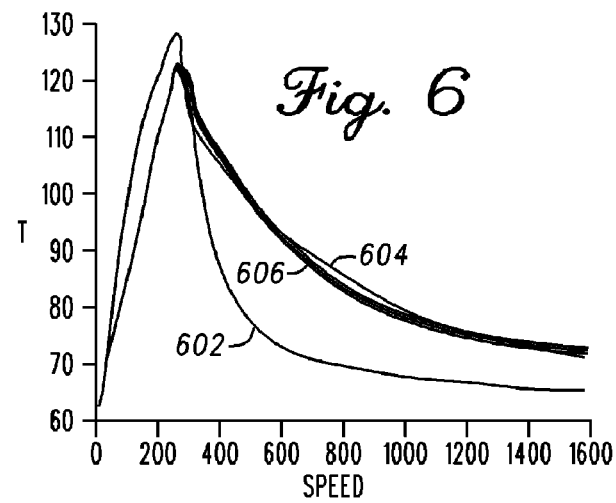
FIGS. 6-8 are plots showing graphical results pertaining to instrumented tests conducted using some of the exemplary embodiments for estimating rotor temperatures and controlling induction motors using the system of FIG. 1 under various conditions.
Figure 7:
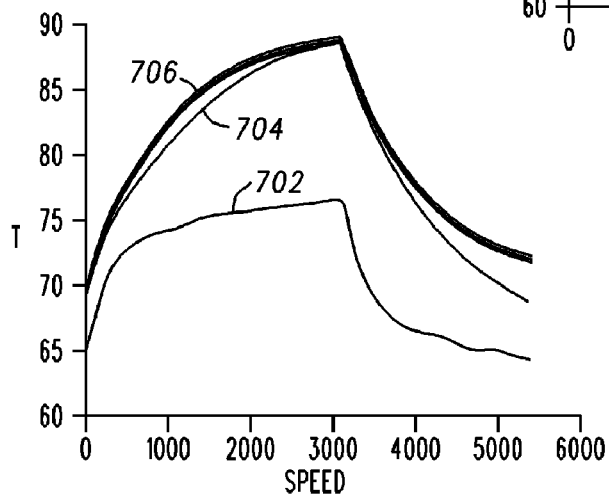

Accordingly, the controller 160 provides a more accurate estimation of rotor temperatures ($T_r$) and rotor resistances ($R_r$) to provide a more efficient and improved operation of the induction motor 110. Turning now to FIGS. 6 and 7, plots are provided of graphical results pertaining to instrumented tests conducted using some of the exemplary embodiments for estimating rotor resistance and controlling induction motors under various conditions.

FIG. 6 is a comparison between measured temperatures of the stator 602, measured temperatures of the rotor 604, and estimated rotor temperatures 606 plotted over a range of time in seconds. The estimated rotor temperatures were generated according to the exemplary embodiments discussed above. Accordingly, in FIG. 6, the rotor temperature rises at 2000 rpm and at an initial torque of 30 Nm. Then, zero torque is applied to allow the motor to cool down. When the torque is zero, the thermal model is used to estimate the rotor temperature. As shown in FIG. 6, the estimated rotor temperatures 606 accurately estimate the measured rotor temperatures 604 at zero torque, particularly as compared to the stator temperatures 602. As noted above, some conventional controllers use the measured stator temperature as an estimate for the rotor temperature.

FIG. 7 is a comparison between measured temperatures of the stator 702, measured temperatures of the rotor 704, and estimated rotor temperatures 706 plotted over a range of time in seconds. The estimated rotor temperatures were estimated according to the exemplary embodiments discussed above. Accordingly, in FIG. 7, the rotor temperatures 706 are estimated in the thermal model estimation module 166 for the entire time range since the torque is relatively low. As shown in FIG. 7, the estimated rotor temperatures 706 accurately estimate the measured rotor temperatures 704, particularly as compared to the stator temperatures 702. Although FIGS. 6 and 7 indicate that the rotor temperature estimates are accurate in steady state, the controller 160 similarly provides accurate rotor temperature estimates in transient states as the torque command fluctuates.

Figure 8:
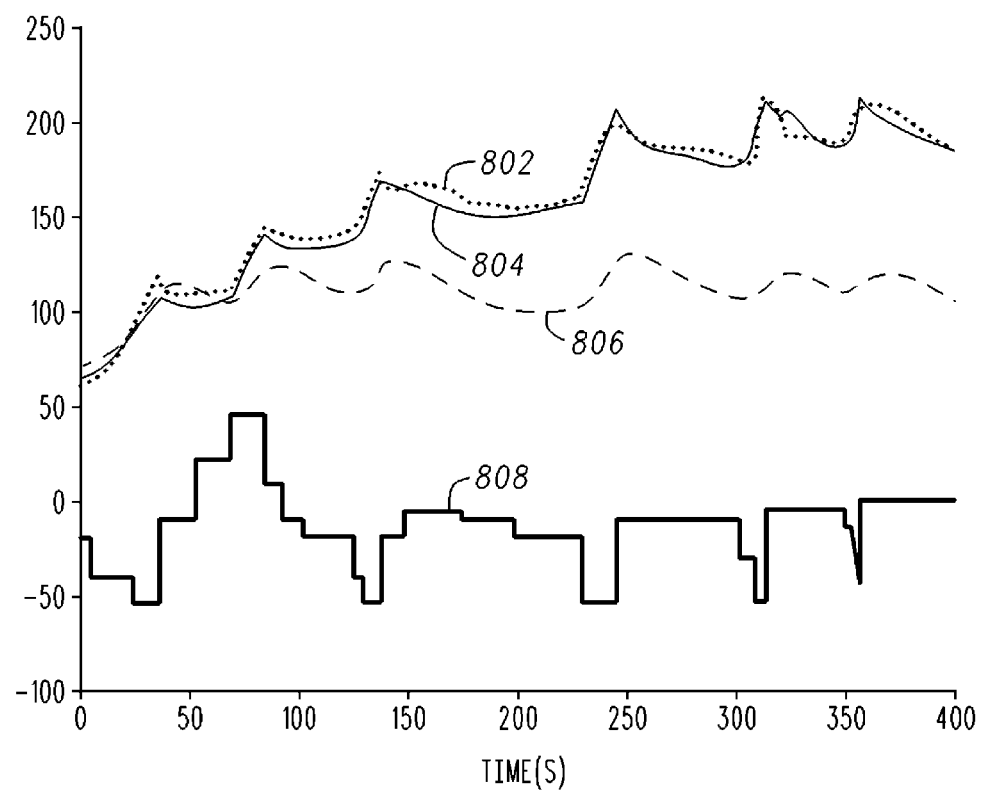

FIG. 8 is a comparison of rotor temperature estimation over a broad torque range. The estimated rotor temperature is indicated by line 802. The rotor temperature is indicated by line 804. The stator temperature is indicated by line 806, and the torque is indicated by line 808. As noted above, when the torque 808 is greater than a threshold (5 Nm in this example), the rotor resistance estimation is used to estimate rotor temperature 802. When the torque 808 is less than the threshold, the thermal model is used to estimate rotor temperature 802. As shown in FIG. 8, this estimated rotor temperature 802 tracks the measured rotor temperature 804 more accurately than the stator temperature 806.

The disclosed methods and systems provide for improved estimation of rotor resistance in induction motors and for improved control of induction motors. For example, the disclosed methods and systems provide for potentially more accurate estimation and control of rotor resistance of induction motors. The disclosed methods and system also allow such estimation and control of rotor resistance of induction motors using potentially less expensive sensors and/or other equipment, and/or allows for such estimation and control of rotor resistance of induction motors to be conducted more quickly and/or more cost effectively. In addition, the disclosed methods and system potentially provide such estimation and control of rotor resistance of induction motors that are reliable in both steady state and transient conditions.

The disclosed embodiments may be applied to any type of induction motor system, such as a hybrid electric vehicle (HEV) or any type of vehicle. Examples of such vehicles include automobiles such as buses, cars, trucks, sport utility vehicles, vans, vehicles that do not travel on land such as mechanical water vehicles including watercraft, hovercraft, sailcraft, boats and ships, mechanical under water vehicles including submarines, mechanical air vehicles including aircraft and spacecraft, mechanical rail vehicles such as trains, trams and trolleys, etc. In addition, the term vehicle is not limited by any specific propulsion technology such as gasoline or diesel fuel. Rather, vehicles also include hybrid vehicles, battery electric vehicles, hydrogen vehicles, and vehicles which operate using various other alternative fuels.

It should be observed that the disclosed embodiments reside primarily in combinations of method steps and apparatus components. Those of skill would further appreciate that the various illustrative logical blocks, modules, circuits, and algorithm steps described in connection with the embodiments disclosed herein may be implemented as electronic hardware, computer software, or combinations of both. The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for controlling an induction motor having a rotor, comprising the steps of:
   receiving a torque command;
   comparing the torque command to a threshold torque value;
      generating, with a first estimation module, a first estimated rotor resistance when the torque command is less than or equal to the threshold torque value;
      generating, with a second estimation module, a second estimated rotor resistance when the torque command is greater than the threshold torque value; and
      generating control signals for the induction motor based on the first estimated rotor resistance or the second estimated rotor resistance.

2. The method of claim 1, wherein the step of generating, with the first estimation module, the first estimated rotor resistance includes
   estimating a rotor temperature.

3. The method of claim 2, wherein the induction motor is cooled by a coolant, and wherein the estimating step includes
   estimating a power loss in the rotor; and
   estimating a thermal resistance between the rotor and the coolant.

4. The method of step 2, wherein the estimating step includes
   estimating a rotor current.

5. The method of claim 4, wherein the step of estimating the rotor current includes
   estimating the rotor current as a function of an inductance of the rotor.

6. The method of claim 4, wherein the step of estimating the rotor current includes
   determining a correction factor based on the rotor speed.

7. The method of claim 6, wherein the step of determining the correction factor includes
   retrieving the correction factor from a look-up table based on the rotor speed.

8. The method of claim 1, wherein the step of generating, with the second estimation module, the second estimated rotor resistance includes calculating an estimated squared value of flux of the rotor using the torque command;
determining a resistance offset of the rotor; and
generating an updated measure of the second estimated rotor resistance using the estimated squared value and the resistance offset.

9. The method of claim 8, wherein the step of determining a resistance offset includes
determining the resistance offset using the torque command and a look-up table.

10. The method of claim 9, wherein the step of determining a resistance offset further includes
determining the resistance offset using the rotor speed.

11. The method of claim 10, further comprising the step of:
determining a rotor position of the rotor, and
wherein the step of calculating an estimated squared value includes
calculating the estimated squared value using the rotor speed and the rotor position.

12. A system for controlling an induction motor having a rotor, the system comprising:
a transition module configured to receive a rotor speed of the rotor and a torque command;
a first estimation module coupled to the transition module and configured to generate a first resistance estimation;
a second estimation module coupled to the transition module and configured to generate a second resistance estimation; and
a controller module coupled to the first estimation module and the second estimation module and configured to generate control signals for the induction motor based on the first resistance estimation or the second resistance estimation as a function of the torque command.

13. The system of claim 12, wherein the controller module is configured to
generate the control signals based on the first resistance estimation when the torque command is less than or equal to a threshold torque value, and
generate the control signals based on the second resistance estimation when the torque command is greater than the threshold torque value.

14. The system of claim 13, wherein the first estimation module is configured to generate the first resistance estimation based on a rotor temperature.

15. The system of claim 14, further comprising a cooling system with coolant configured to cool the induction motor, and
wherein the first estimation module is configured to generate the first resistance estimation based on a power loss in the rotor and a thermal resistance between the rotor and the coolant.

16. The system of step 15, wherein the first estimation module is configured to generate the first resistance estimation based a rotor current.

17. The system of claim 16, wherein the first estimation module is configured to estimate the rotor current as a function of an inductance of the rotor.

18. The system of claim 17, wherein the first estimation module is configured to estimate the rotor current based on a correction factor that is a function of the rotor speed.

19. The system of claim 18, wherein the first estimation module includes a look-up table with the correction factor.

20. An induction motor system, comprising:
a motor comprising a rotor and a stator;
an inverter assembly coupled to the motor and configured to drive the motor based on control signals; and
a controller coupled to the inverter assembly and configured to generate the control signals, the controller comprising:
a transition module configured to receive a rotor speed of the rotor and a torque command,
a first estimation module coupled to the transition module and configured to generate a first resistance estimation,
a second estimation module coupled to the transition module and configured to generate a second resistance estimation, and
a controller module coupled to the first estimation module and the second estimation module and configured to generate control signals for the induction motor based on the first resistance estimation or the second resistance estimation as a function of the torque command.

* * * * *